United States Patent
Lee et al.

(10) Patent No.: US 12,404,594 B2
(45) Date of Patent: Sep. 2, 2025

(54) WATER ELECTROLYSIS CATALYST WITH CORE-SHELL STRUCTURE AND METHOD FOR PREPARING SAME

(71) Applicant: Industry-University Cooperation Foundation Hanyang University Erica Campus, Ansan-si (KR)

(72) Inventors: Seunghyun Lee, Ansan-si (KR); Thangjam Ibomcha Singh, Ansan-si (KR); Dun Chan Cha, Ansan-si (KR); Sumin Kim, Ansan-si (KR)

(73) Assignee: Industry-University Cooperation Foundation Hanyang University Erica Campus, Ansan-si (KR)

( * ) Notice: Subject to any disclaimer, the term of this patent is extended or adjusted under 35 U.S.C. 154(b) by 0 days.

(21) Appl. No.: 18/376,601

(22) Filed: Oct. 4, 2023

(65) Prior Publication Data

US 2024/0117512 A1    Apr. 11, 2024

(30) Foreign Application Priority Data

Oct. 6, 2022   (KR) .................. 10-2022-0128029

(51) Int. Cl.
| | |
|---|---|
| *C25B 11/091* | (2021.01) |
| *B01J 23/847* | (2006.01) |
| *B01J 27/18* | (2006.01) |
| *B01J 27/185* | (2006.01) |
| *B01J 27/24* | (2006.01) |
| *B01J 35/53* | (2024.01) |
| *C25B 11/031* | (2021.01) |
| *C25B 11/054* | (2021.01) |

(Continued)

(52) U.S. Cl.
CPC ......... *C25B 11/091* (2021.01); *B01J 23/8472* (2013.01); *B01J 27/18* (2013.01); *B01J 27/1853* (2013.01); *B01J 27/24* (2013.01); *B01J 35/53* (2024.01); *C25B 11/031* (2021.01); *C25B 11/054* (2021.01); *C25B 11/061* (2021.01); *C25D 9/04* (2013.01)

(58) Field of Classification Search
CPC ... C25B 11/031; C25B 11/054; C25B 11/061; C25B 11/091; B01J 35/53; B01J 23/8472; B01J 27/18; B01J 27/1853; B01J 27/24; C25D 9/04
See application file for complete search history.

(56) References Cited

FOREIGN PATENT DOCUMENTS

| | | | |
|---|---|---|---|
| JP | 7061249 B2 | 4/2022 | |
| KR | 10-2021-0065252 A | 6/2021 | |
| KR | 102438940 B1 * | 9/2022 | ............. B01J 23/34 |

OTHER PUBLICATIONS

Singh, Thangjam Ibomcha, et al. "High-alkaline water-splitting activity of mesoporous 3D heterostructures: an amorphous-shell@ crystalline-core nano-assembly of Co—Ni-phosphate ultrathin-nanosheets and V-doped cobalt-nitride nanowires." Advanced Science 9.23 (2022): 2201311.*

(Continued)

*Primary Examiner* — Richard M Rump
(74) *Attorney, Agent, or Firm* — NSIP Law

(57) ABSTRACT

Provided is a water electrolysis catalyst with a core-shell structure, which has a vanadium-doped cobalt nitride (V—$Co_4N$) core; and a cobalt-nickel phosphate ($CoNiPO_x$, x is a natural number) shell.

11 Claims, 7 Drawing Sheets
(7 of 7 Drawing Sheet(s) Filed in Color)

(51) Int. Cl.
  *C25B 11/061*    (2021.01)
  *C25D 9/04*     (2006.01)

(56) References Cited

OTHER PUBLICATIONS

Chen, Zhiyan, et al. "Tailoring the d-band centers enables Co4N nanosheets to be highly active for hydrogen evolution catalysis." Angewandte Chemie International Edition 57.18 (2018): 5076-5080.*

Wu, Jian, et al. "Novel nickel-cobalt phosphite with face-sharing octahedra derived electrocatalyst for efficient water splitting." Inorganic Chemistry Frontiers 6.8 (2019): 2014-2023.*

Pei, Yu, et al. "Controlled electrodeposition synthesis of Co—Ni—P film as a flexible and inexpensive electrode for efficient overall water splitting." ACS applied materials & interfaces 9.37 (2017): 31887-31896.*

Wang, Yueqing, et al. "3 D porous nickel-cobalt nitrides supported on nickel foam as efficient electrocatalysts for overall water splitting." ChemSusChem 10.21 (2017): 4170-4177.*

Xue, Ziliang, et al. "Self-supported cobalt nitride porous nanowire arrays as bifunctional electrocatalyst for overall water splitting." Electrochimica Acta 273 (2018): 229-238.*

Meng, Y., et al. "Recent advances in the application of phosphates and borates as electrocatalysts for water oxidation." Materials Today Nano 12 (2020): 100095.*

\* cited by examiner

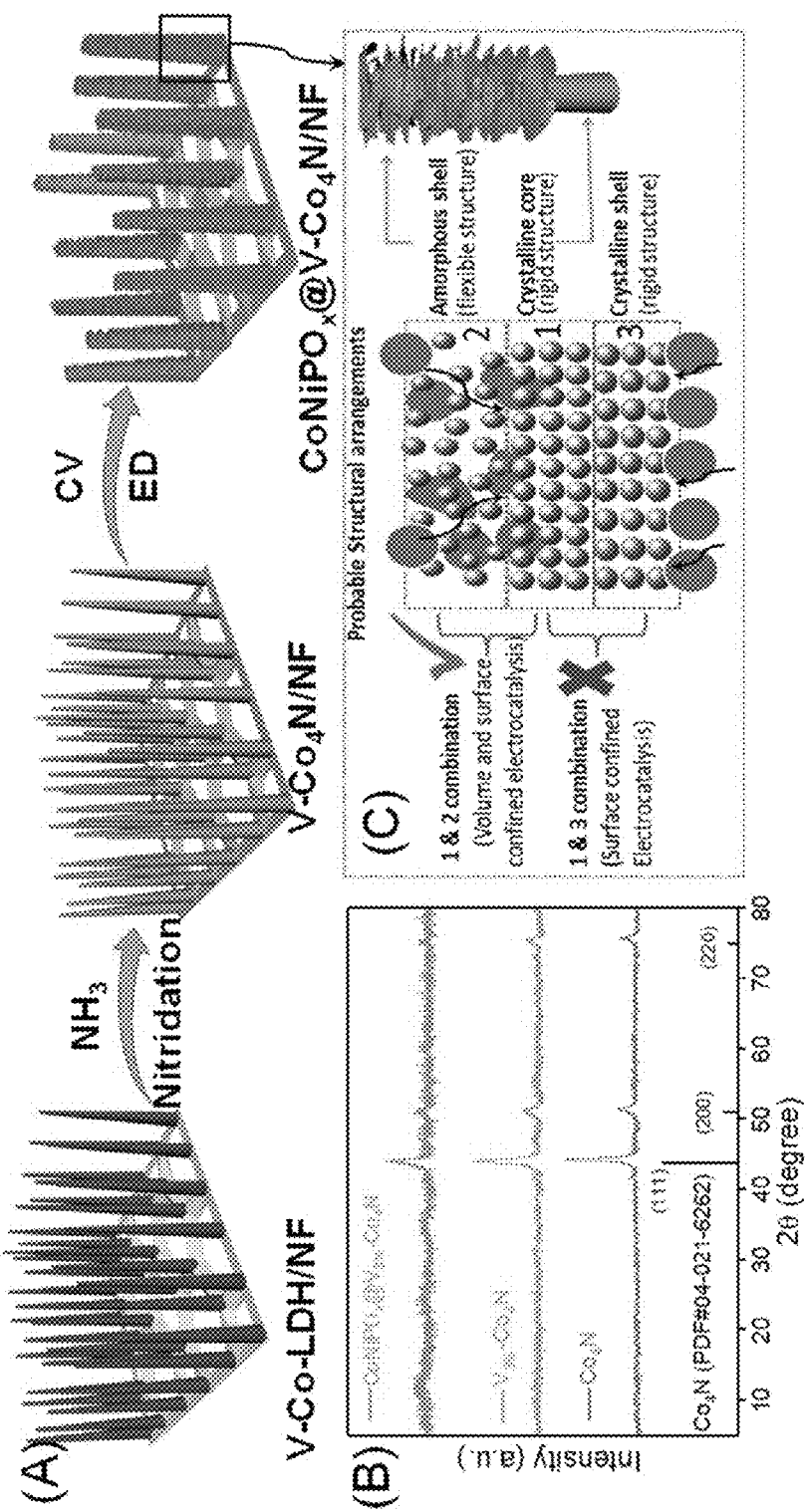
[FIG. 1]

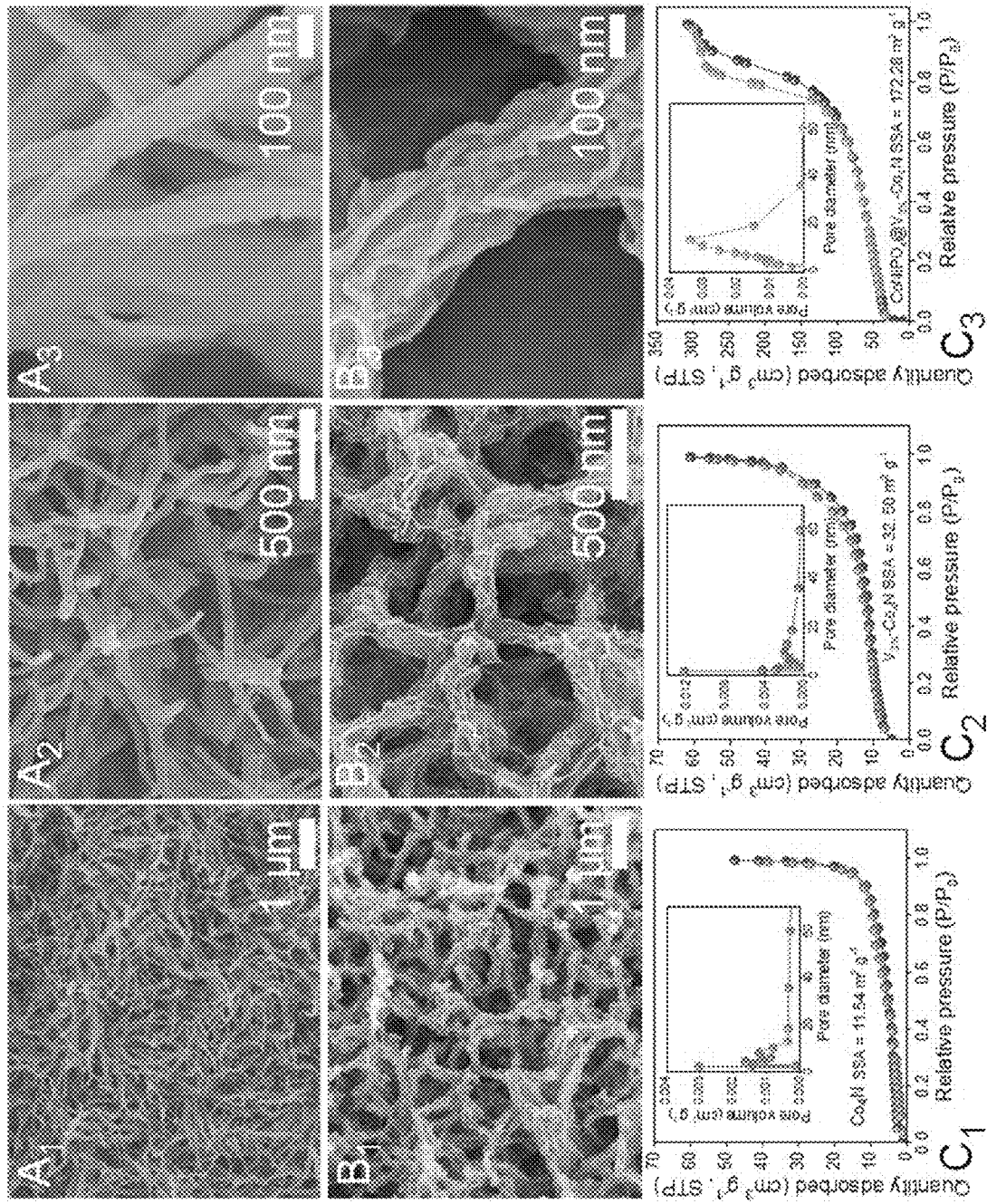
[FIG. 2]

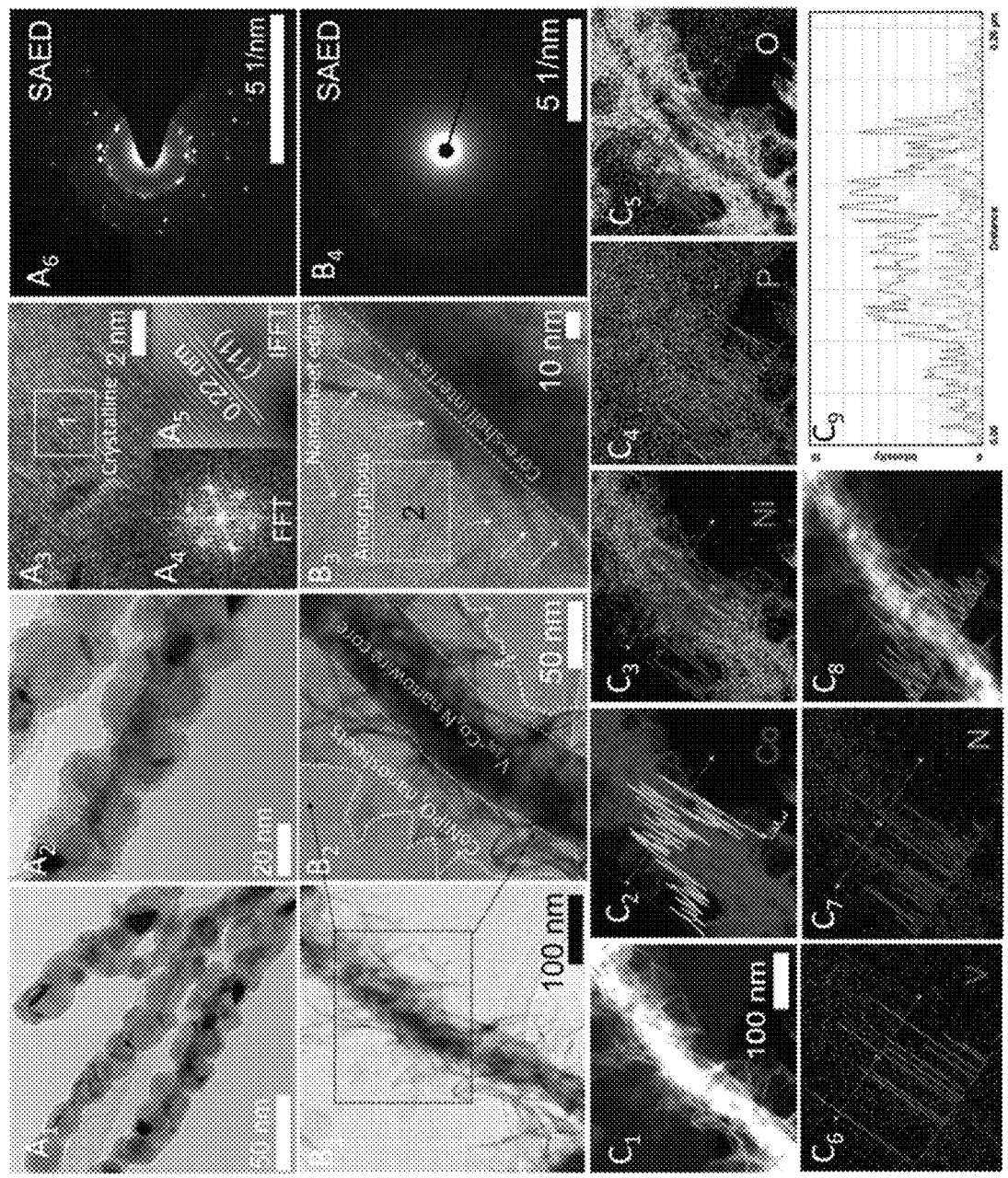
[FIG. 3]

[FIG. 4]
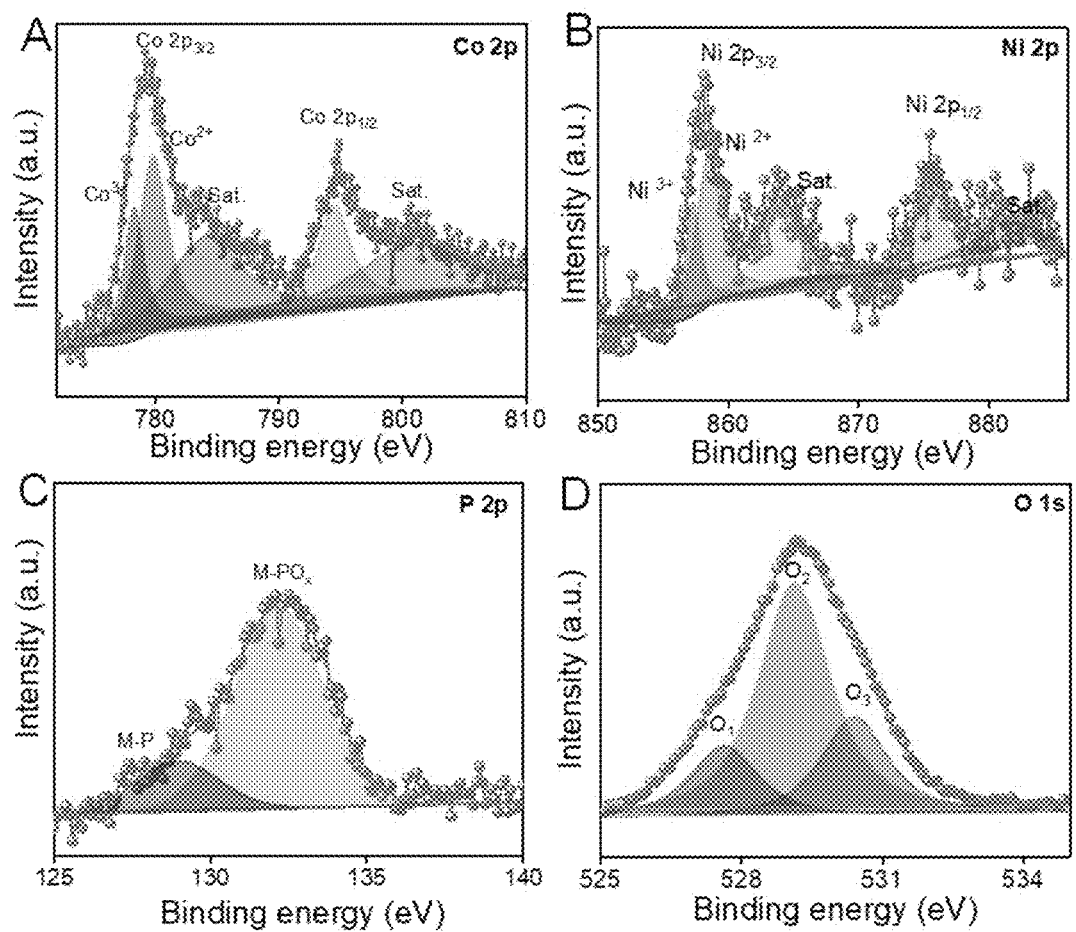

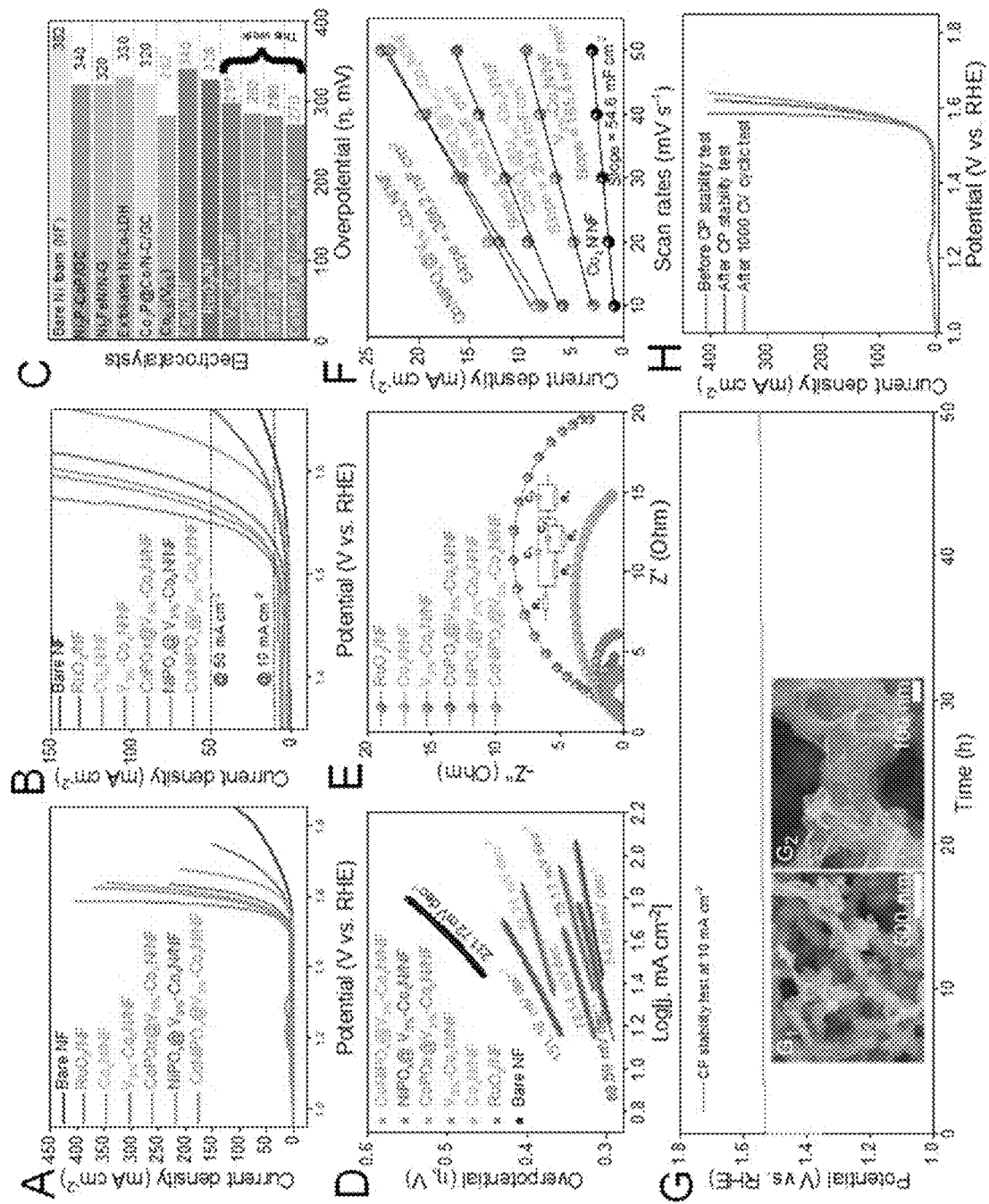
[FIG. 5]

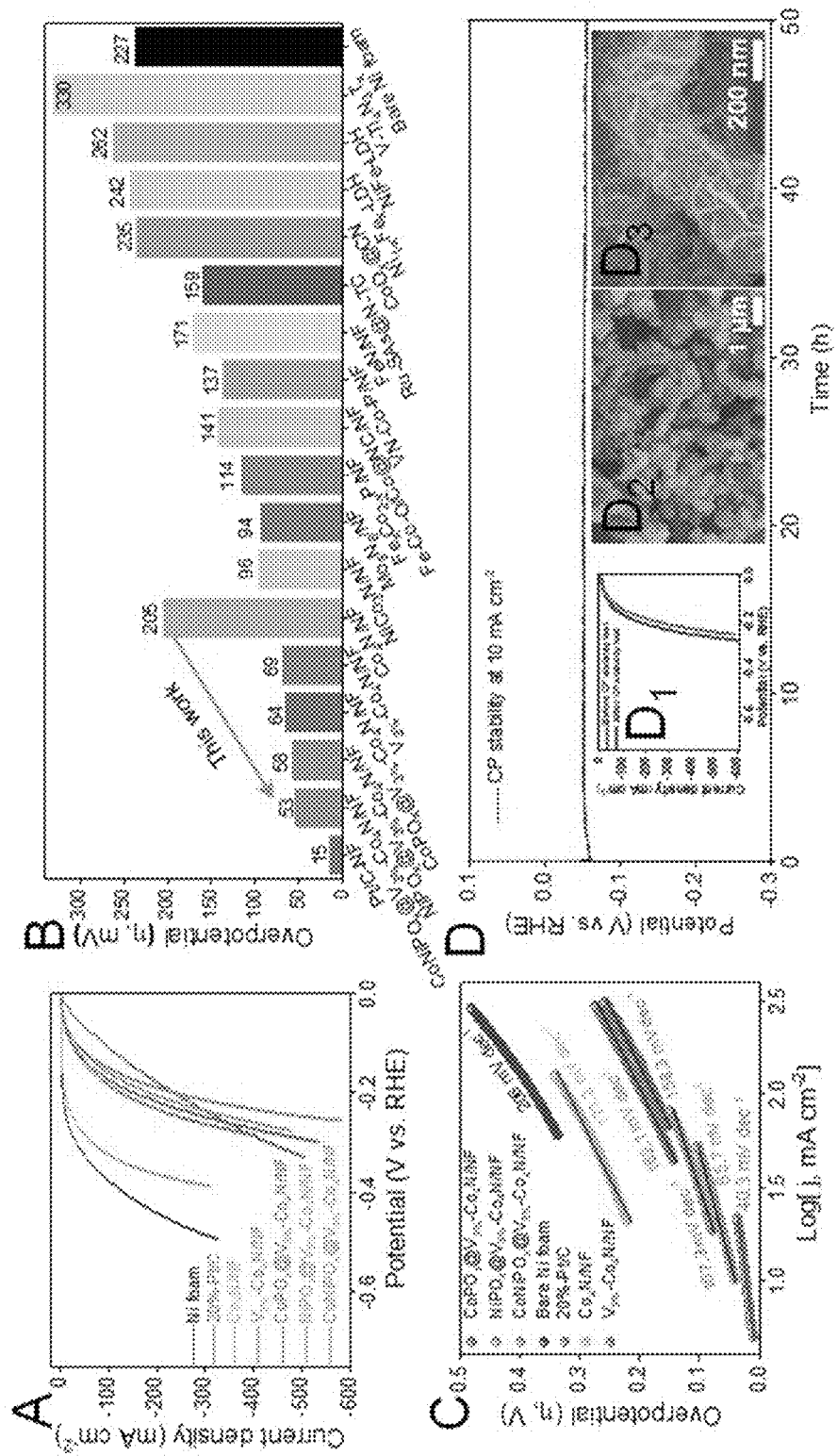
[FIG. 6]

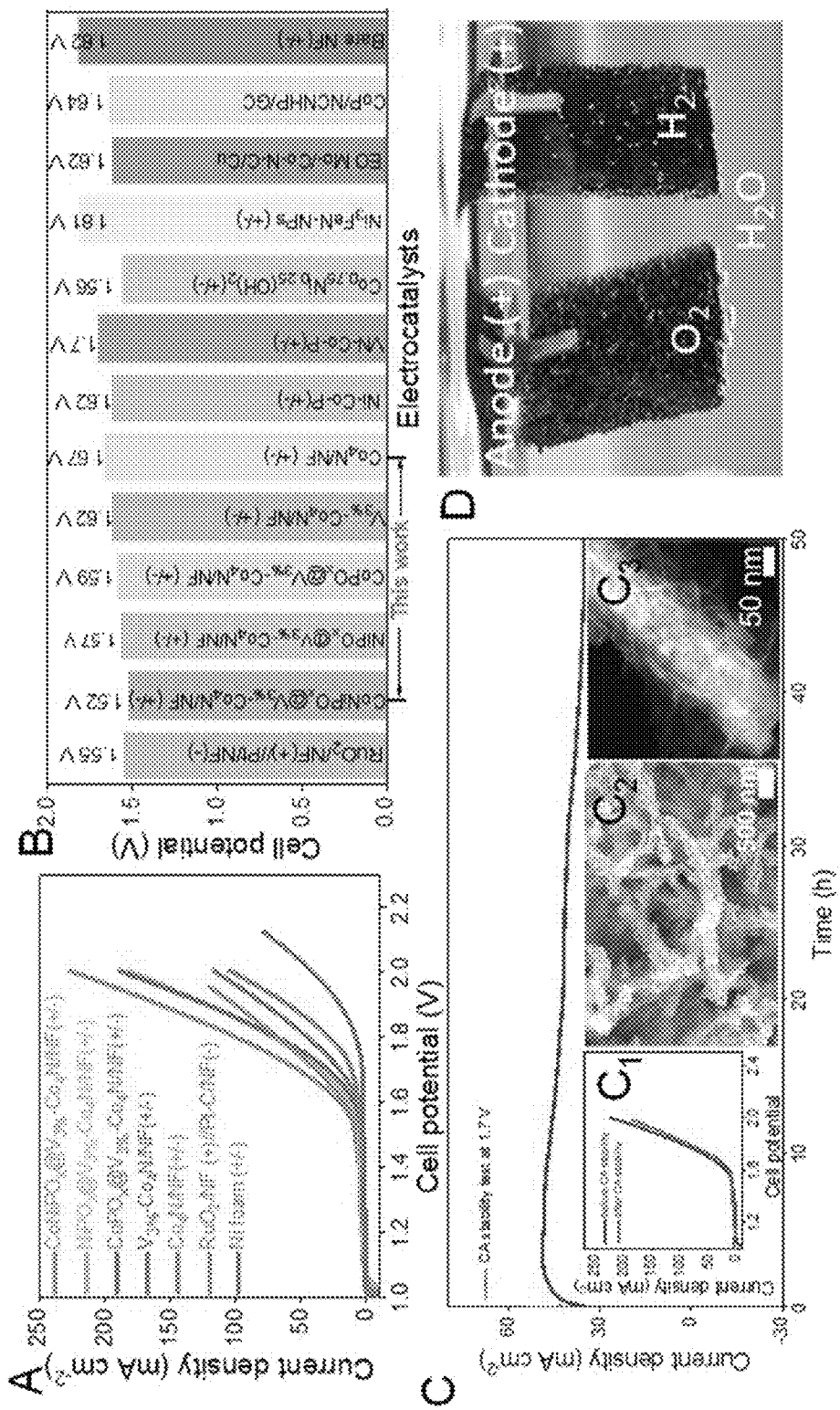
[FIG. 7]

WATER ELECTROLYSIS CATALYST WITH CORE-SHELL STRUCTURE AND METHOD FOR PREPARING SAME

TECHNICAL FIELD

The present disclosure relates to a water electrolysis catalyst with a core-shell structure and a method for preparing the same, more particularly to a water electrolysis catalyst with a core-shell structure, having HER and OER reaction characteristics, particularly having improved OER and HER overpotentials, abundant active site, lower charge transfer resistance and improved electrochemically active surface area (ECSA) by growing cobalt-nickel phosphate on a vanadium-doped cobalt nitride (V—$Co_4N$) nanowire which has been grown directly on a conductive 3D nickel substrate, and a method for preparing the same.

<Korean National Research and Development Projects that Supported the Present Disclosure>
1. Project ID number: 1415180416 (project number: 20015991)
    Ministry name: Ministry of Trade, Industry and Energy
    Name of project management organization: Korea Evaluation Institute of Industrial Technology
    Research project name: Development of high-purity biphenyl monomers containing less than 2 ppm of ionic impurities and fillers with spheroidization rate of 95% or higher for eco-friendly, high-functionality EMC
2. Project ID number: 1415186835 (project number: 20022507)
    Ministry name: Ministry of Trade, Industry and Energy
    Name of project management organization: Korea Evaluation Institute of Industrial Technology
    Research project name: Development of technology for compounding elastic HNBR materials with dispersibility of grade 7 or higher
3. Project ID number: 1711161947 (project number: 2019R1C1C1009427)
    Ministry name: Ministry of Science and ICT
    Name of project management organization: National Research Foundation of Korea
    Research project name: Research on preparation and optical characteristics analysis of metal nanoparticle-based nanocomposites and application thereof
4. Project ID number: 1711156873 (project number: 2021 M3H4A1A02056025)
    Ministry name: Ministry of Science and ICT
    Name of project management organization: National Research Foundation of Korea
    Research project name: Development of technology for synthesis and color change standardization of high-sensitivity stress-sensitive color shift sensor materials
5. Project ID number: 2021001000 (project number: GRRC 2020-B03)
    Ministry name: Ministry of Science and ICT
    Name of project management organization: National Research Foundation of Korea
    Research project name: Research on development of multifunctional carbon hybrid catalyst materials based on intelligent information technology (Gyeonggi-do)

BACKGROUND ART

Increasing concerns about global warming and depletion of fossil reserves have accelerated the quest for carbon-free and sustainable alternative fuels, leading to rapid development of the $H_2$-based economy.

Green hydrogen produced by electrochemical water splitting using discontinuous energy sources such as renewable energy sources has enormous potential as sustainable energy due to high efficiency, large gravimetric energy density ($\approx$140 MJ kg−1) and carbon-free characteristics.

However, the four proton-coupled electron transfer (POET) at the positive electrode (anode) and the additional water splitting at the negative electrode prior to proton reduction inhibit OER (oxygen evolution reaction) and HER (hydrogen evolution reaction) that require large overpotential. Therefore, the innovative design of bifunctional electrocatalysts for OER and HER is important for efficient water splitting in alkaline media since it improves the intrinsic and extrinsic catalyst properties.

Currently, it is regarded that platinum (Pt) and platinum alloys exhibit the highest HER activity while $RuO_2$ and $IrO_2$ are the most suitable for OER. However, the mass use of these metallic materials is economically unsustainable due to their high prices and scarcity. Therefore, it is necessary to develop a bifunctional electrode catalyst which is abundant and inexpensive.

In this regard, it is necessary to develop a catalyst having high OER and HER activities using relatively inexpensive metals such as cobalt (Co) and nickel (Ni).

REFERENCES OF RELATED ART

Patent Documents (Patent document 1) Korean Patent Publication No. 10-2021-0065252.
(Patent document 2) Japanese Patent No. 7061249.

DISCLOSURE

Technical Problem

The present disclosure is directed to providing a catalyst having high OER and HER activities using relatively inexpensive metals such as cobalt (Co) and nickel (Ni) and a method for preparing the same.

Technical Solution

The present disclosure provides a water electrolysis catalyst with a core-shell structure, which has: a vanadium-doped cobalt nitride (V—$Co_4N$) core; and a cobalt-nickel phosphate ($CoNiPO_x$, x is a natural number) shell.

In an exemplary embodiment of the present disclosure, the core has crystalline characteristics and the shell has amorphous characteristics.

In an exemplary embodiment of the present disclosure, the water electrolysis catalyst with a core-shell structure has a pore structure and, in the vanadium-doped cobalt nitride, vanadium is doped at 2-4 at %.

In an exemplary embodiment of the present disclosure, the vanadium-doped cobalt nitride (V—$Co_4N$) core is a nanowire that has grown on a nickel foam and the shell is deposited on the nanowire which is the core by an electrodeposition process and, as a result, pore volume and specific surface area are increased.

The present disclosure also provides an electrode for water electrolysis which includes the water electrolysis catalyst with a core-shell structure described above.

The present disclosure also provides a water electrolysis system which includes the electrode for water electrolysis including the water electrolysis catalyst described above.

The present disclosure also provides a method for preparing a water electrolysis catalyst with a core-shell structure, which includes: a step of forming a cobalt carbonate hydroxide hydrate nanowire on a support; a step of doping vanadium in the nanowire and preparing a vanadium-doped cobalt nitride nanowire through nitridation treatment; and a step of depositing cobalt-nickel phosphate on the nanowire.

In an exemplary embodiment of the present disclosure, the catalyst is the catalyst described above and the support is a nickel foam.

In an exemplary embodiment of the present disclosure, the vanadium is doped in the nanowire at 2-4 at %.

In an exemplary embodiment of the present disclosure, the deposition is performed by an electrodeposition process and, as a result, pore volume and specific surface area are increased.

Advantageous Effects

A catalyst according to the present disclosure has a core-shell structure, wherein the shell is a nanosheet of an amorphous, ultrathin transition metal phosphate array and has very strong activity for OER. And, the core is electrochemically controlled crystalline core having superior HER activity. A combination of these two structures may provide both OER and HER activities in alkaline media.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1 shows A) a schematic diagram for synthesis of amorphous shell@crystalline core $CoNiPO_x@V-Co_4N$ 3D heterostructures on a conductive and porous Ni foam substrate, B) the P-XRD patterns of crystalline $Co_4N$ and $V_{3\%}-Co_4N$ nanowires and a $CoNiPO_x@V_{3\%}-Co_4N$ amorphous shell@crystalline core heterostructure and C) schematic representation of the structural arrangements of crystalline (1, 3) and amorphous (2) materials, resulting in surface- and volume-confined electrocatalysts.

FIG. 2 shows low- and high-magnification FE-SEM images of $A_1$-$A_3$) $V_{3\%}-Co_4N$ and $B_1$-$B_3$) $CoNiPO_x@V_{3\%}-Co_4N$ and BET and BJH pore size distribution of $C_1$) $Co_4N$, $C_2$) $V_{3\%}-Co_4N$ and $C_3$) $CONiFO_x@V_{3\%}-CO_4N$.

FIG. 3 shows ($A_1$, $A_2$ and $B_1$, $B_2$) low-resolution TEM images, ($A_3$ and $B_3$) high-resolution TEM images, ($A_4$ and $A_5$) FFT and IFFT of region 1 of $A_3$, ($A_6$ and $B_4$) SAED of region 1 in $A_3$ of $V_{3\%}-Co_4N$ core and region 2 in $B_3$ of $CoNiPO_x$ nanosheet shell, ($C_1$) a HAADF-STEM image of $CoNiPO_x@V_{3\%}-Co_4N$ heterostructure, ($C_2$-$C_9$) elemental color mapping results showing the presence of Co ($C_2$), Ni ($C_3$), P ($C_4$), O ($C_5$), V ($C_6$) and N ($C_7$) and the corresponding overlapped line mappings ($C_8$, $C_9$) for $CoNiPO_x@V_{3\%}-Co_4N$ electrocatalysts.

FIG. 4 shows deconvoluted high-resolution XPS spectra of A) Co 2p, B) Ni 2p, C) P 2p and D) O1s spectra of the electrodeposited $CoNiPO_x$ shells of $CoNiPO_x@V_{3\%}-Co_4N/NF$ electrocatalysts.

FIG. 5 shows electrochemical evaluation results for catalysts for OER: A) iR-corrected LSV profiles, B) magnified LSV profiles for determining overpotentials at current densities of 10 and 50 mA $cm^{-2}$, C) overpotential comparison results at 10 mA $cm^{-2}$ with recently reported electrocatalysts such as $Co_{0.5}(V_{0.5})$ and Co2P@Co/N-C/GC, D) Tafel plots, E) EIS spectra (insert shows the corresponding equivalent impedance circuit diagram), F) current density versus scan rate profiles for evaluation of electric double layer method (Cd), G) long-term CP stability test result of $CoNiPO_x@V_{3\%}-Co_4N/NF$ for 50 hours at a current density of 10 mA $cm^{-2}$ ($G_1$, $G_2$) and H) CP stability test results of $CoNiPO_x@V_{3\%}-Co_4N/NF$ after 1000 and 10000 cycles.

FIG. 6 shows electrochemical evaluation of electrode catalysts prepared for HER: A) iR-corrected LSV profiles of $CoNiPO_x@V_{3\%}-Co_4N/NF$, $NiPOx@V_{3\%}-Co_4N/NF$, $CoPO_x@V_{3\%}-Co_4N/NF$, $V_{3\%}-Co_4N/NF$, $Co_4N/NF$, 20%-Pt/C/NF and bare Ni foam, B) comparison of overpotentials at a current density of 10 mA $cm^{-2}$ with previously known electrodes (such as $NiCo_3N/NF$, $Mo_5N_6$, $Fe_xCo_{2-x}P/NF$, Fe—Co—O/Co@NC/NF, VN—Co—P/NF, FeN/NF, Ru—SAs@N-TC, $CoO_x@CN$, $Ni_{1-x}Fe$-LDH, NiFe-LDH and V-$Ti_4N_3T_x$), C) Tafel plots and D) long-term CP stability test results for 50 hours at a current density of 10 mA $cm^{-2}$, $D_1$) comparison of LSV profiles before and after CP stability test and $D_2$, $D_3$) low- and high-magnification FE-SEM images of $CoNiPO_x@V_{3\%}-Co_4N/NF$ after long-term CP stability test for HER.

FIG. 7 shows electrochemical evaluation for overall water splitting: A) LSV profiles of $CoNiPO_x@V_{3\%}-Co_4N/NF$ (+/−), $NiPOx@V_{3\%}-Co_4N/NF$(+/−), $CoPO_x@V_{3\%}-Co_4N/NF$(+/−), $V_{3\%}-Co_4N/NF$(+/−), $Co_4N/NF$(+/−), $RuO_2/NF$(+)/Pt-C/NF(−) and Ni foam (+/−) electrolyzers, B) comparison of overpotentials at a current density of 10 mA $cm^{-2}$ of prepared electrode catalysts with previously reported alkaline electrolyzers, $C_1$) LSV profiles before and after CA stability test, $C_2$) FE-SEM images, $C_3$) HAADF-STEM images of $CoNiPO_x@V_{3\%}-Co_4N/NF$ after CA stability test and D) digital images showing evolution of oxygen and hydrogen by a $CoNiPO_x@V_{3\%}-Co_4N/NF$ catalyst according to the present disclosure.

BEST MODE

Hereinafter, specific exemplary embodiments of the present disclosure will be described in detail referring to the attached drawings.

Prior to the description of the present disclosure, it is to be understood that the terms or words used in the present specification should not be construed as limited to their ordinary or dictionary meanings and the inventor of the present disclosure can adequately define the concepts of various terms in order to explain his/her invention in the best way.

In addition, it is to be understood that these terms or words should be interpreted with meanings and concepts consistent with the technical idea of the present disclosure.

That is to say, the terms used in the present specification are used only to describe the specific exemplary embodiments of the present disclosure and are not intended to specifically limit the contents of the present disclosure.

It is to be understood that the terms are defined in consideration of various possibilities of the present disclosure.

In addition, in the present specification, singular expressions may include plural expressions unless the context clearly indicates otherwise.

Similarly, it should be noted that plural expressions may also include singular expressions.

Throughout the present specification, when a certain component is described to "include" another component, any another component may exist further unless the context clearly indicates otherwise.

Furthermore, when a certain component is described to be "present in or connected to" another component, the components may be connected directly or in contact with each other.

In addition, they may be spaced apart with a certain distance. When they are spaced apart with a certain distance, there may be a third component or means for fixing or connecting the component to another component.

It is to be noted that the description of the third component or means may be omitted.

On the other hand, when a component is described to be "directly connected" to another component, it should be understood that no third component or means exists.

Likewise, other expressions that describe the relationship between components, such as "between", "immediately between", "neighboring", "directly neighboring", etc., should be interpreted as having similar meanings.

In addition, in the present specification, the terms such as "one surface", "the other surface", "one side", "the other side", the first", "the second", etc. are used to clearly distinguish one component from other components.

However, it should be noted that the meaning of the corresponding component is not limited by such terminology.

In addition, in the present specification, terms related to positions such as "top", "bottom", "left", "right", etc. should be understood to indicate the relative position of the corresponding component in the drawing.

In addition, unless the absolute position is specified, the position-related terms should not be understood as referring to absolute positions.

In the drawings attached to the present specification, the size, position, relationship of combination, etc. of each component may be somewhat exaggerated, reduced or omitted in order to fully convey the idea of the present disclosure or for the convenience of explanation. Therefore, the proportion or scale may be incorrect.

In addition, when describing the present disclosure, the detailed description of known technologies including prior art may be omitted to avoid unnecessarily obscuring the gist of the present disclosure.

The present disclosure provides a high-performance bifunctional electrocatalyst for OER and HER, for overall water splitting in an alkaline medium, having an amorphous shell@crystalline core heterostructure. The catalyst according to the present disclosure has a core-shell structure, wherein the shell is a nanosheet of an amorphous, ultrathin transition metal phosphate array and has very strong activity for OER. And, the core is electrochemically controlled crystalline core having superior HER activity. A combination of these two structures may provide both OER and HER activities in alkaline media.

For this, the present disclosure provides a catalyst having a core-shell structure consisting of vanadium-doped cobalt nitride (V—$Co_4N$) and cobalt-nickel phosphate ($CoNiPO_x$, x is a natural number), which has characteristics for both HER and OER reactions.

The water electrolysis catalyst according to the present disclosure is prepared by synthesizing a cobalt carbonate hydroxide hydrate nanowire on a support such as a nickel foam, conducting vanadium doping/nitridation treatment and then coating the nanowire with cobalt-nickel phosphate to form a catalyst having the nanowire as a core and the coating layer as a shell layer.

The catalyst according to the present disclosure can be used as an electrode of a water electrolysis system, especially as an electrode material of a water electrolysis system, since it exhibits superior current density and hydrogen/oxygen evolution.

Hereinafter, the present disclosure is described in more detail through examples. However, the scope of the present disclosure is not limited by the examples.

EXAMPLES

Example 1-1

Synthesis of Cobalt Carbonate Hydroxide Hydrate (Co—CHH) Nanowire on Ni Foam

Cobalt nitrate hexahydrate (2 mmol), urea (4 mmol) and ammonium tetrafluoride (2 mmol) were dissolved in 50 mL of DI water in a beaker under continuous magnetic stirring at 400 rpm for 30 minutes. Then, the solution was transferred to a Teflon-lined stainless steel autoclave (100 mL), along with a pair of pre-cleaned Ni foam (2×4 $cm^{-2}$) pieces, and sealed. The autoclave was placed in an electric oven and heated at 120° C. for 6 hours. Finally, the autoclave was cooled to room temperature (25° C.) and the nickel foam pieces were collected, washed several times with water and ethanol, and dried at 60° C. for 12 hours.

Example 1-2

Synthesis of Vanadium-Doped Cobalt Carbonate Hydroxide Hydrate Nanowire ($V_x$—Co—CHH/NF, x=0, 1, 3 and 5 at %)

$V_x$—Co—CHH/NF was also synthesized under experimental conditions similar to those of Co—CHH/NF by adding different quantities of ammonium metavanadate (1, 3 and 5 at %) as a V source to the Co—CHH/NF precursor solution such that the total concentration of the metal salts remained the same (2 mmol). Finally, the samples were collected, washed with water and ethanol, and dried at 60° C. for 12 hours.

Example 1-3

Synthesis of Vanadium-Doped Cobalt Nitride Nanowire on Ni Foam ($V_x$—$Co_4N$/NF, x=0, 1, 3 and 5 at %)

The prepared $V_x$—Co—CHH/NF sample was subjected to thermal nitridation using ammonia gas as N source. That is to say, after injecting 500 sccm of $NH_3$ gas to the prepared $V_x$—Co—CHH/NF sample in a chamber, the temperature was raised at a slow heating rate of 2.5° C./min to 450° C. and then maintained for 2 hours. Finally, the heating was stopped and a vanadium-doped cobalt nitride nanowire ($V_x$—$Co_4N$/NF) was synthesized by cooling the sample to room temperature (25° C.).

Compared to all other concentrations, $V_{3\%}$—$Co_4N$/NF (3 at %) was found to be the best sample. The mass loadings of $Co_4N$ and $V_{3\%}$—$Co_4N$ electrocatalysts per 1 $cm^{-2}$ area of the Ni foam were 3.46 and 3.58 mg, respectively.

Example 1-4

Synthesis of CoNiPO$_x$@V$_{3\%}$—Co$_4$N/NF Heterostructure Catalysts with Amorphous Shell@Crystalline Core Structure CoNiPO$_x$@V$_{3\%}$—Co$_4$N/NF heterostructure catalysts were prepared by electrodepositing a CoNiPO$_x$ nanosheet shell on the V$_{3\%}$—Co$_4$N/NF core pre-synthesized in Example 1-3 using cyclic voltammetry (CV). Typically, the electrodeposition process was carried out using V$_{3\%}$—Co$_4$N/NF (2×2 cm$^{-2}$) as a working electrode, Ag/AgCl (vs sat. KCl) as a reference electrode and Pt wire as a counter electrode. The solution for electrodeposition of the CoNiPO$_x$ shell was prepared by dissolving 1 mmol of each of Co(NO$_3$)$_2$·6H$_2$O, Ni(NO$_3$)$_2$·6H$_2$O and NaH$_2$PO$_2$ (MW: 87.98 g mol$^{-1}$) as Co, Ni and P sources in a 100 mL solution mixture of ethanol and DI water at a volume ratio of 1:1.

Among the various conditions of CV, the growth of the CoNiPO$_x$ nanosheet was observed to be the most uniform, well-developed and ultrathin at scan rate of 6 mV s$^{-1}$ and was chosen as the optimum condition for the electrodeposition of the CoNiPO$_x$ nanosheet throughout the experiment. For comparison, binary CoPO$_x$ and NiPO$_x$ nanosheets were also electrodeposited under the same optimum condition (6 mV s$^{-1}$ for two segments) using the corresponding electrodeposition solutions. Finally, the electrodeposited samples were washed several times in DI water and dried at 60° C. for 12 hours. The mass loadings of the CoNiPO$_x$@V$_{3\%}$—Co$_4$N, CoPO$_x$@V$_{3\%}$—Co$_4$N and NiPOx@V$_{3\%}$—Co$_4$N electrocatalysts per 1 cm$^{-2}$ area of the Ni foam were 6.3, 5.23 and 4.67 mg, respectively.

Example 1-5

Synthesis of CoNiPO$_x$@V$_{3\%}$—Co$_4$N/NF, (C)—NiPOx@V$_{3\%}$—Co$_4$N/NF and (C)—CoPO$_x$@V$_{3\%}$—Co$_4$N/NF Heterostructure Catalysts with Crystalline Shell@Crystalline Core Structure For preparation of crystalline-shell@crystalline core heterostructure catalysts, the CoNiPO$_x$@V$_{3\%}$—Co$_4$N/NF, NiPOx@V$_{3\%}$—Co$_4$N/NF and CoPO$_x$@V$_{3\%}$—Co$_4$N/NF with amorphous shell@crystalline core structure prepared in Example 1-4 were heat-treated at 400° C. under argon gas atmosphere for 2 hours.

These samples were denoted as (C)—CoNiPO$_x$@V$_{3\%}$—Co$_4$N/NF, (C)—NiPOx@V$_{3\%}$—Co$_4$N/NF and (C)—CoPO$_x$@V$_{3\%}$—Co$_4$N/NF to represent the crystalline shell@crystalline core structure.

For comparison of electrocatalytic performance, RuO$_2$/NF and Pt/C/NF (20% Pt loading) electrocatalysts were prepared.

The RuO$_2$/NF and Pt/C/NF (20% Pt loading) electrocatalysts were prepared using the catalyst ink coating method similarly to those previously reported (see T. I. Singh, G. Rajeshkhanna, U. N. Pan, T. Kshetri, H. Lin, N. H. Kim, J. H. Lee, Small 2021, 17, 2101312., T. I. Singh, G. Rajeshkhanna, S. B. Singh, T. Kshetri, N. H. Kim, J. H. Lee, *ChemSusChem* 2019, 12, 4810).

For this, 5 mg of each of commercial RuO$_2$ and 20% Pt-loaded graphitic carbon was separately dispersed in a solution mixture of 750 µL of isopropanol, 200 µL of deionized water and 50 µL of Nafion solution by ultrasonication for 2 hours. The prepared catalyst ink was then coated on two pieces of Ni foam (1×1 cm$^{-2}$ area). The coated Ni foam pieces were vacuum-dried in a vacuum oven at 60° C. for 24 hours.

Test Example 1

FIG. 1 shows A) a schematic diagram for synthesis of amorphous shell@crystalline core CoNiPO$_x$@V—Co$_4$N 3D heterostructures on a conductive and porous Ni foam substrate, B) the P-XRD patterns of crystalline Co$_4$N and V$_{3\%}$—Co$_4$N nanowires and a CoNiPO$_x$@V$_{3\%}$—Co$_4$N amorphous shell@crystalline core heterostructure and C) schematic representation of the structural arrangements of crystalline (1, 3) and amorphous (2) materials, resulting in surface- and volume-confined electrocatalysts.

Referring to FIG. 1, it can be seen that the CoNiPO$_x$@V$_{3\%}$—Co$_4$N that has passed through the nitridation and electrodeposition processes exhibits a P-XRD pattern similar to that of Co$_4$N (B). In addition, it can be seen from FIG. 1 (C) that the catalyst according to the present disclosure have a structure of a crystalline shell (3) and a crystalline core (2) wherein an amorphous shell (3) is formed on the core (2).

Test Example 2

FIG. 2 shows low- and high-magnification FE-SEM images of A$_1$-A$_3$) V$_{3\%}$—Co$_4$N and B$_1$-B$_3$) CoNiPO$_x$@V$_{3\%}$—Co$_4$N and BET and BJH pore size distribution of C$_1$) Co$_4$N, C$_2$) V$_{3\%}$—Co$_4$N and C$_3$) CONiFO$_x$@V$_{3\%}$—Co$_4$N.

Referring to FIG. 2, it can be seen that specific surface area (172.28 m$^2$ g$^{-1}$) and pore volume (0.03 cm$^3$·g$^{-1}$) are increased after the electrodeposition process. The specific surface area of the CoNiPO$_x$@V$_{3\%}$—Co$_4$N prepared in the present disclosure through the electrodeposition process is increased because of its superior pore characteristics.

Test Example 3

FIG. 3 shows (A$_1$, A$_2$ and B$_1$, B$_2$) low-resolution TEM images, (A$_3$ and B$_3$) high-resolution TEM images, (A$_4$ and A$_5$) FFT and IFFT of region 1 of A$_3$, (A$_6$ and B$_4$) SAED of region 1 in A$_3$ of V$_{3\%}$—Co$_4$N core and region 2 in B$_3$ of CoNiPO$_x$ nanosheet shell, (C$_1$) a HAADF-STEM image of CoNiPO$_x$@V$_{3\%}$—Co$_4$N heterostructure, (C$_2$-C$_9$) elemental color mapping results showing the presence of Co (C$_2$), Ni (C$_3$), P (C$_4$), O (C$_5$), V (C$_6$) and N (C$_7$) and the corresponding overlapped line mappings (C$_8$, C$_9$) for CoNiPO$_x$@V$_{3\%}$—Co$_4$N electrocatalysts.

Test Example 4

FIG. 4 shows deconvoluted high-resolution XPS spectra of A) Co 2p, B) Ni 2p, C) P 2p and D) O1s spectra of the electrodeposited CoNiPO$_x$ shells of CoNiPO$_x$@V$_{3\%}$—Co$_4$N/NF electrocatalysts.

Test Example 5

FIG. 5 shows electrochemical evaluation results for catalysts for OER: A) iR-corrected LSV profiles, B) magnified LSV profiles for determining overpotentials at current densities of 10 and 50 mA cm$^{-2}$, C) overpotential comparison results at 10 mA cm$^{-2}$ with recently reported electrocatalysts such as Co$_{0.5}$(V$_{0.5}$) and Co2P@Co/N-C/GC, D) Tafel plots, E) EIS spectra (insert shows the corresponding equivalent impedance circuit diagram), F) current density versus scan rate profiles for evaluation of electric double layer method (Cd), G) long-term CP stability test result of CoNiPO$_x$@V$_{3\%}$—Co$_4$N/NF for 50 hours at a current density of 10 mA cm$^{-2}$ (G$_1$, G$_2$) and H) CP stability test results of CoNiPO$_x$@V$_{3\%}$—Co$_4$N/NF after 1000 and 10000 cycles.

Referring to FIG. 5, it can be seen that the CoNiPO$_x$@V$_{3\%}$—Co$_4$N/NF according to an exemplary embodiment of the present disclosure exhibits the best OER characteristics. That is to say, it showed the lowest overpotential and the highest current density (see FIGS. 5A and C).

Test Example 6

FIG. 6 shows electrochemical evaluation of electrode catalysts prepared for HER: A) iR-corrected LSV profiles of CoNiPO$_x$@V$_{3\%}$—Co$_4$N/NF, NiPOx@V$_{3\%}$—Co$_4$N/NF, CoPO$_x$@V$_{3\%}$—Co$_4$N/NF, V$_{3\%}$—Co$_4$N/NF, Co$_4$N/NF, 20%-Pt/C/NF and bare Ni foam, B) comparison of overpotentials at a current density of 10 mA cm$^{-2}$ with previously known electrodes (such as NiCo$_3$N/NF, Mo$_5$N$_6$, Fe$_x$Co$_{2-x}$P/NF, Fe—Co—O/Co@NC/NF, VN—Co—P/NF, FeN/NF, Ru—SAs@N-TC, CoO$_x$@CN, Ni$_{1-x}$Fe-LDH, NiFe-LDH and V—Ti$_4$N$_3$T$_x$), C) Tafel plots and D) long-term CP stability test results for 50 hours at a current density of 10 mA cm$^{-2}$, D$_1$) comparison of LSV profiles before and after CP stability test and D$_2$, D$_3$) low- and high-magnification FE-SEM images of CoNiPO$_x$@V$_{3\%}$—Co$_4$N/NF after long-term CP stability test for HER.

Referring to FIG. 6, it can be seen that the electrode according to the present disclosure shows superior hydrogen evolution efficiency and cycle characteristics.

Test Example 7

FIG. 7 shows electrochemical evaluation for overall water splitting: A) LSV profiles of CoNiPO$_x$@V$_{3\%}$—Co$_4$N/NF (+/−), NiPOx@V$_{3\%}$—Co$_4$N/NF(+/−), CoPO$_x$@V$_{3\%}$—Co$_4$N/NF(+/−), V$_{3\%}$—Co$_4$N/NF(+/−), Co$_4$N/NF(+/−), RuO$_2$/NF(+)/Pt-C/NF(−) and Ni foam (+/−) electrolyzers, B) comparison of overpotentials at a current density of 10 mA cm$^{-2}$ of prepared electrode catalysts with previously reported alkaline electrolyzers, C$_1$) LSV profiles before and after CA stability test, C$_2$) FE-SEM images, C$_3$) HAADF-STEM images of CoNiPO$_x$@V$_{3\%}$—Co$_4$N/NF after CA stability test and D) digital images showing evolution of oxygen and hydrogen by a CoNiPO$_x$@V$_{3\%}$—Co$_4$N/NF catalyst according to the present disclosure.

Particularly referring to FIG. 7A, it can be seen that the catalyst electrode according to the present disclosure has high current density per cell voltage.

The invention claimed is:

1. A water electrolysis catalyst with a core-shell structure, having:
    a vanadium-doped cobalt nitride (V—Co$_4$N) core; and
    a cobalt-nickel phosphate (CoNiPO$_x$, x is a natural number) shell,
    wherein, in the vanadium-doped cobalt nitride, vanadium is doped at 3 at %.

2. The water electrolysis catalyst with a core-shell structure according to claim 1, wherein the core has crystalline characteristics and the shell has amorphous characteristics.

3. The water electrolysis catalyst with a core-shell structure according to claim 1, wherein the water electrolysis catalyst with a core-shell structure has a pore structure.

4. The water electrolysis catalyst with a core-shell structure according to claim 1, wherein the vanadium-doped cobalt nitride (V—Co$_4$N) core is a nanowire that has grown on a nickel foam.

5. The water electrolysis catalyst with a core-shell structure according to claim 4, wherein the shell is deposited on the nanowire which is the core by an electrodeposition process and, as a result, pore volume and specific surface area are increased.

6. An electrode for water electrolysis comprising the water electrolysis catalyst with a core-shell structure according to claim 5.

7. A water electrolysis system comprising the electrode for water electrolysis comprising the water electrolysis catalyst according to claim 6.

8. A method for preparing the water electrolysis catalyst of claim 1, comprising:
    a step of forming a cobalt carbonate hydroxide hydrate nanowire on a support;
    a step of doping vanadium in the nanowire and preparing the vanadium-doped cobalt nitride core through nitridation treatment; and
    a step of depositing the cobalt-nickel phosphate shell on the vanadium-doped cobalt nitride core.

9. The method for preparing a water electrolysis catalyst with a core-shell structure according to claim 8, wherein the support is a nickel foam.

10. The method for preparing a water electrolysis catalyst with a core-shell structure according to claim 8, wherein the vanadium is doped in the nanowire at 3 at %.

11. The method for preparing a water electrolysis catalyst with a core-shell structure according to claim 8, wherein the deposition is performed by an electrodeposition process and, as a result, pore volume and specific surface area are increased.

* * * * *